United States Patent [19]
Lundquist

[11] Patent Number: 5,700,865
[45] Date of Patent: Dec. 23, 1997

[54] FLOORING MATERIAL

[75] Inventor: Eskil Lundquist, Ronneby, Sweden

[73] Assignee: Tarkett AG, Frankenthal, Germany

[21] Appl. No.: 621,025

[22] Filed: Mar. 22, 1996

[30] Foreign Application Priority Data

Sep. 15, 1995 [SE] Sweden ................................. 9503197

[51] Int. Cl.⁶ ................................................... C08L 83/00
[52] U.S. Cl. ................................................ 524/506; 524/502
[58] Field of Search ................................. 524/506, 502

[56] References Cited

U.S. PATENT DOCUMENTS

| | | | |
|---|---|---|---|
| 5,244,942 | 9/1993 | Hover et al. | 523/171 |
| 5,276,082 | 1/1994 | Forry et al. | 524/504 |

FOREIGN PATENT DOCUMENTS 0683205  11/1995  European Pat. Off. .

OTHER PUBLICATIONS

International Search Report dated Dec. 17, 1996.
English language abstract of EPO 0 683 205 A1.

*Primary Examiner*—Helen Lee
*Attorney, Agent, or Firm*—Brooks Haidt Haffner & Delahunty

[57] ABSTRACT

A flooring material comprises 30–70 parts by weight of a copolymer of ethylene and an α-olefin having 4–10 carbon atoms, preferably an ethylene/octene copolymer, 20–40 parts by weight of polypropylene, 5–20 parts by weight of a crosslinked ethylene polymer, preferably a copolymer of ethylene and an ethylenically unsaturated silane compound, 10–25 parts by weight of an organic filler, preferably polyethylene having a melt index below 0.1 g/10 min (190° C./21.6 kg) and a phase stability in the flooring material of at least about 200° C., 0.2–7 parts by weight of a flame retardant, preferably silicone and magnesium stearate, 0.1–2 parts by weight of an antistatic agent, and 0.1–1 part by weight of a stabiliser. The flooring material is free from inorganic fillers.

20 Claims, No Drawings

FLOORING MATERIAL

The invention relates to a flooring material, and more specifically concerns a halogen-free flooring material that is free from inorganic fillers.

In order to be acceptable, a flooring material has to possess a number of different properties, which are more or less incompatible. One such property is processibility, i.e. it has to be possible to process the material so as to form it into a sheetlike or weblike flooring material. In this context, it is of primary importance that the material is easily calendered. Furthermore, the flooring material should be wear- and scratch-resistant, and its surface should exhibit such friction as to be suited for use, for instance by people walking on it. In addition, the material should be weldable, enabling the provision of tight joints when putting down a floor. The flooring material should, moreover, enable optimum cleaning, and should thus be polishable and preferably have a dirt-repellent surface. The resilience and the softness of the flooring material, which are measured by indentation-recovery, are essential qualities, which are of importance in order to avoid lasting indentations of furniture and rolling objects, such as office chairs, and which also affect the walking comfort. Moreover, the fire resistance is vital, and the flooring material should be as fire-resistant as possible while, if catching fire, giving off as little irritant smoke as possible.

Using polyvinyl-chloride-based materials, such as polyvinyl chloride (PVC) and vinyl chloride copolymers, primarily copolymers of vinyl chloride and vinyl acetate, as flooring materials is previously known. These materials have many advantages, such as fetching a low price, being easy to process, and having a great range of variation, i.e. the properties of the material are easily adjusted with the aid of various additives, such as plasticisers and pigments.

However, PVC-based flooring materials also suffer from a number of drawbacks. In recent years, attention has focused on these drawbacks, and efforts have been made to provide other synthetic flooring materials not based on PVC. Among other things, PVC-based flooring materials are disadvantageous in that they contain chlorine (halogen), which forms hydrogen chloride upon combustion. Also, the various additives included in PVC-based flooring materials and typically containing different metal compounds yield metal-containing residues when combusted. For reasons of costs and properties, PVC-based flooring materials further contain considerable amounts of fillers which generally are of inorganic type, such as calcium carbonate, clays, and aluminium trihydrate. These inorganic fillers are non-combustible and thus leave a contaminating residue, which has to be deposited, when the flooring material is combusted. When PVC-based flooring materials are combusted, various additives, such as lime or dolomite, are used for binding released chlorine. As a result, larger amounts of material have to be deposited, and the costs are increased.

Also, an addition of inorganic fillers has an adverse effect on the wear resistance of the material.

In an effort to obviate the above-mentioned draw-backs of the PVC-based flooring materials, one has, in recent years, tried to develop halogen-free flooring materials, which usually are based on different mixtures of olefin polymers. U.S. Pat. No. 5,276,082 teaches such a halogen-free flooring material, which comprises a mixture of a silane-grafted polymer and an ungrafted polymer. To be more specific, the mixture contains a first component, which is a copolymer of ethylene and another monomer selected from the vinyl esters of saturated and unsaturated carboxylic acids, preferably vinyl acetate, and a second component, which consists of a silane-grafted version of the above-mentioned ethylene copolymer, i.e. preferably silane-grafted ethylene/vinyl acetate. A third essential component of the mixture is a filler, preferably calcium carbonate, clay or aluminium trihydrate, which is present in an amount of 30–90% by weight.

Even though the flooring material according to U.S. Pat. No. 5,276,082 is free from halogen, it has, like other prior-art flooring materials, a high content of inorganic fillers, which result in the formation of environmentally questionable or objectionable metal-containing substances and ash when destroyed by combustion of the flooring material.

This invention aims at obviating the drawbacks of the prior art by providing a halogen-free flooring material which is not based on PVC and, in addition, is free from inorganic fillers.

According to the invention, this aim is achieved by a flooring material comprising a defined composition of olefin polymers in combination with an organic filler and certain additives.

To be more specific, the invention provides a flooring material which is characterised in that it comprises 30–70 parts by weight of a copolymer of ethylene and an α-olefin having 4–10 carbon atoms, 20–40 parts by weight of polypropylene, 5–20 parts by weight of a crosslinked ethylene polymer, 10–25 parts by weight of an organic filler, 0.2–7 parts by weight of a flame retardant, 0.1–2 parts by weight of an antistatic agent, and 0.1–1 part by weight of a stabiliser, and that the material is free from inorganic fillers.

Preferably, the flooring material according to the invention comprises

40–60 parts by weight of a copolymer of ethylene and an α-olefin having 4–10 carbon atoms, 25–30 parts by weight of polypropylene, 5–15 parts by weight of a crosslinked ethylene polymer, 10–20 parts by weight of an organic filler, 0.6–4 parts by weight of a flame retardant, 0.1–1 part by weight of an antistatic agent, and 0.1–1 part by weight of a stabiliser.

These and other distinctive features and advantages of the invention will appear in more detail from the following description as well as the appended claims.

As indicated above, the flooring material according to the invention contains a first component in the form of 30–70 parts by weight, preferably 40–60 parts by weight, of a copolymer of ethylene and an α-olefin having 4–10 carbon atoms. This component is intended to impart elasticity to the material and to reduce its melting temperature, resulting in a wider temperature range for processing and hence improving the processibility of the material. The copolymer also improves the properties of the flooring material as regards wear resistance and indentation-recovery. In order to attain an aimed-at processing range of about 150°–200° C., the melting point of the copolymer should be below 120° C., preferably ranging between about 50° C. and 100° C. The density of the copolymer is about 0.87–0.92 g/cm³. Octene is a preferred α-olefin comonomer, and an instance of a preferred copolymer is the ethylene/octene copolymer available from Dow under the designation DSH 8501.00.

As a second component, the flooring material according to the invention contains 20–40 parts by weight of polypropylene, preferably 25–30 parts by weight. This component enhances the hardness of the material and reduces its friction. In addition, the dirt-repellent qualities of the material are improved, i.e. the flooring material becomes easier to clean. An example of a preferred propylene polymer is the one available from Borealis AB under the tradename of Embryon®HG 770 J having a density of 0.903 g/cm$^3$ and a melt flow of 25 g/10 min (230° C./2.16 kg).

As a third component, the flooring material according to the invention contains 5–20 parts by weight, preferably 5–15 parts by weight, of a crosslinked ethylene polymer, preferably a silane-crosslinked ethylene polymer. The preferred silane-crosslinked ethylene polymer may consist of either a Graft copolymer of ethylene and an ethylenically unsaturated, hydrolysable silane compound or, which is preferred, a copolymer of ethylene and an ethylenically unsaturated, hydrolysable silane compound. As silane compound, use may, for instance, be made of vinyl silanes, such as vinyl trimethoxy silane. Such silane (graft) copolymers are crosslinked under the action of water and a silanol condensation catalyst, such as dibutyltin dilaurate. The crosslinked ethylene polymer component improves the processing properties of the mixture by increasing the viscosity of the material and hence reducing the mobility therein, thereby facilitating the achievement of the aimed-at patterns. Furthermore, the crosslinked ethylene polymer improves the properties of the material as regards wear and indentation-recovery. In order to optimise the effect of the crosslinked ethylene polymer component in the composition, the degree of crosslinking should not be too high. Preferably, the silane compound constitutes about 1–30% by weight, preferably about 1–15% by weight, of the crosslinked ethylene polymer. As an example of a preferred crosslinkable ethylene polymer, mention may be made of the products LE 4421 and LE 4438 available from Borealis AB. The former is the polymer itself, whereas the latter is the cross-linking catalyst.

As a fourth component, the flooring material according to the invention contains 10–25 parts by weight, preferably 10–20 parts by weight, of an organic filler. By the term "organic filler" is meant an organic material which, upon combustion, leaves a residue of no more than 10% by weight, preferably no more than 5% by weight, and which preferably consists chiefly, i.e. to at least 95% by weight, of carbon, hydrogen and oxygen. According to the invention, this organic filler is intended to replace, either by itself or in combination with the other components, the inorganic fillers generally used in prior-art flooring materials. In order to be able to perform its function properly, the organic filler should be phase-stable, i.e. form a phase of its own in the form of discrete particles in the flooring material, when the flooring material is being processed. Since the flooring material is normally processed at a temperature below about 200° C., this means that the organic filler should be phase-stable or "particle-stable", i.e. be present in the form of discrete particles in the flooring material, up to a temperature of at least about 200° C. According to the invention, the organic filler preferably is a polymer material selected from one or more of: starch, cellulose and polyethylene, the polyethylene having a melt index below 0.1 g/10 min (190° C./21.6 kg) and a phase stability to at least about 200° C. When used as fillers, starch and cellulose are advantageous in that they both have fairly high contents of hydroxyl groups, which are cross-linked with the silane groups of the crosslinkable ethylene polymer component. This provides yet another possibility of adjusting the properties of the material. As an example of a preferred polyethylene filler, mention may be made of the polymer marketed under the tradename of Lupolen UHM201 by BASF and having a density of 0.93 g/cm$^3$ and a melt flow below 0.1 g/10 min (190° C./21.6 kg). This polyethylene filler also contributes to giving the flooring material a harder surface.

Apart from the components mentioned above, the flooring material according to the invention contains certain additives, as appears from the foregoing and will be described in more detail below.

In order to obtain the aimed-at flame resistance, the material contains 0.2–7 parts by weight of a flame retardant, preferably 0.6–4 parts by weight. Even though conventional flame retardants are not excluded from the flooring material according to the invention, it is especially preferred that the flame retardant is a silicone replacing conventional antimony- or halogen-containing flame retardants. The effect of the silicone is enhanced by combining it with an organic metal salt, more specifically an organic salt of a metal from the group IIA of the Periodic table. Preferably, the organic metal salt is magnesium stearate. The above flame retardant contents include both the silicone and the organic metal salt. Normally, the silicone is present in an amount of 0.1–5 parts by weight, preferably 0.5–3 parts by weight, while the organic metal salt is present in an amount of 0.1–2 parts by weight, preferably 0.1–1 part by weight. In addition to imparting the aimed-at flame-retardant properties to the material, the flame retardant has a lubricating ability, which facilitates the processing of the material and further enhances its impact resistance. As an instance of a preferred flame retardant, mention may be made of the product available under the tradename of SFR 100 Silicone Fluid from General Electric. Further details of this flame retardant are found in U.S. Pat. No. 4,387,176.

Moreover, the flooring material according to the invention contains 0.1–2 parts by weight of an antistatic agent, preferably 0.1–1 part by weight. This is an additive required in order to avoid static charging of the flooring material and to improve the dirt-repellent properties of the finished material. The antistatic agent employed in the flooring material according to the invention can be selected from known antistatic agents, but preferably consists of glycerol stearate, for instance in the form of the product available from Hoechst under the tradename of Hostastat FE-2.

Finally, the flooring material contains a stabiliser, which has a stabilising effect as regards oxidation and decomposition (yellowing), which otherwise may occur, for instance in the presence of the antistatic agent mentioned above. As an example of a suitable stabiliser, mention may be made of sterically hindered phenols, for instance those available from Ciba under the tradename of Irganox 1010.

Apart from the components indicated above, the flooring material according to the invention may contain optional conventional additives and pigments.

With the composition described above, in particular the lack of inorganic fillers, the flooring material according to the invention have only marginal contents of metals that are questionable or objectionable from the point of view of the environment and are released by leaching, biological-chemical decomposition or combustion, i.e. the content of such metals as aluminium, lead, cadmium, copper, chromium and zinc is basically zero.

The inventive flooring material of the above composition can be produced by using conventional techniques and conventional equipment. There should thus be no need of any detailed description of the production of the flooring material according to the invention. As an example of such production, it may, however, be mentioned that the components and the additives may first be weighed and mixed in cold state, whereupon the resulting mixture is melted and extruded in the form of bands, which are fed to a rolling mill and there are processed to webs. The resulting webs are cut to pieces or crushed and may then immediately be rolled or pressed to form the finished flooring material. Alternatively, the cut or crushed webs may first be stored and then at a suitable moment be heated and rolled or pressed to form the finished flooring material.

The invention will now be further elucidated with the aid of a few non-restricting Examples. The following comparison is based on two apparently equivalent, 2-mm-thick homogeneous flooring materials intended for public use. The one flooring material is produced in accordance with the invention, while the other flooring material is a PVC-based flooring material of known composition.

The upper side and the lower side of the flooring material according to the invention and the upper side of the PVC-based flooring material were subjected to a corona treatment in order to increase the adhesion. Then, the upper side and the lower side of the flooring material according to the invention were coated with 5 g (based on dry solids) of a primer (based on RIC from PPG Industries) per m². Finally, the one surface (the upper side) of the two flooring materials was coated with 10 g (based on dry solids) of polyurethane (based on NeoRez R-986 from Zeneca Resins) per m². The purpose of this polyurethane layer is to make the flooring materials easier to clean and enhance their dirt-repellent capacity. Since the polyurethane layer affects the wear resistance, the wear-resistance test in Example 1 was also performed on flooring materials having no such surface layer of polyurethane. The other properties of the flooring material are only marginally affected by the polyurethane layer.

The two flooring materials have the following composition.

| Parts by weight | Tradename | Designation | Supplier |
| --- | --- | --- | --- |
| Flooring Material According to the Invention | | | |
| 47.7 | DSH 8501.00 | Ethylene-α-olefin copolymerisate | DOW Chemicals |
| 26 | Embryon ® HG770J | Polypropylene | Borealis |
| 8.7 | LE 4421 | Crosslinkable ethylene polymer | Borealis |
| 0.4 | LE 4438 | Catalyst | Borealis |
| 13 | Lupolen UHM201 | UHMW - PE | BASF |
| 1 | SFR100 | Flame retardant | General Electric |
| 0.7 | Parma | Magnesium stearate | Bärlocher |
| 0.5 | Hostastat FE-2 | Antistatic agent | Hoechst |
| 0.1 | Irganox 1010 | Stabiliser | Ciba |
| 1.9 | | Pigment | |
| PVC-based Flooring Material (Tarkett Eminent from Tarkett AB | | | |
| 47.1 | Norvinyl S6260 | PVC | Norsk Hydro Plast AB |
| 17.2 | DEHP | Diethylhexyl phthalate | Neste Chemicals |
| 0.7 | Lankromark LZ 1694 | BaZn Stabiliser | Akcros Chemicals |
| 0.9 | Lankroflex EWS | Epoxidised soybean oil | Akcros Chemicals |
| 0.3 | Tefacid 1 VT65 | Stearic acid | Tefac AB |
| 12.6 | Strådolomit A30 | Dolomite | Sträbruken AB |
| 10.8 | Sjöhästen FF | Calcium carbonate | Malmökrita AB |
| 8.4 | Kaolin FA | Kaolin | Zavod |
| 2 | | Pigment | |

EXAMPLE 1

In this Example, the wear resistance of the flooring material according to the invention was compared with that of the prior-art, PVC-based flooring material. The wear resistance was determined according to the standard EN 660.

In the test, the wear resistance of the flooring material according to the invention was found to be 1.4 mm³/100 turns for material having a surface layer of polyurethane and 0.65 mm³/100 turns for material having no such surface layer, whereas the PVC-based flooring material had a wear resistance of 3.38 mm³/100 turns when provided with a surface layer of polyurethane and a wear resistance of 3.06 mm³/100 turns when not provided with such a surface layer. Thus, the flooring material according to the invention had a much better wear resistance than the known PVC-based flooring material.

EXAMPLE 2

In this Example, the fire propagation and the smoke emission of the flooring material according to the invention and of the prior-art PVC-based flooring material were tested. The test was carried out in accordance with the standard SIS 024825. According to this standard, the fire propagation should be below 55 cm, and the fire emission should be below 30%.

In the test, the flooring material according to the invention was found to have a fire propagation of 40 cm and a smoke emission of 3%, whereas the PVC-based flooring material was found to have a fire propagation of 22 cm and a smoke emission of 16%. Both materials thus had a fire propagation well below the standard limit. However, the flooring material according to the invention gave off very little smoke and much less than the PVC-based flooring material.

In addition to this test, the fire propagation and the smoke emission were tested according to the so-called Radiation Panel Test. According to this test, an accepted material should require a power exceeding 0.45 W/cm² for fire propagation, and the material should exhibit a smoke emission below 750%·min.

In this test, the flooring material according to the invention required 0.50 W/cm² in order to catch fire and had a smoke emission of 55%·min, whereas the PVC-based flooring material required 0.99 W/cm² in order to catch fire and had a smoke emission of 300%·min. Also in this case, both materials had fire-propagation values and smoke-emission values below the standard limit. However, the flooring material according to the invention gave off much less smoke than the PVC-based flooring material.

EXAMPLE 3

In this Example, the indentation-recovery of the flooring material according to the invention and the PVC-based flooring material were determined in accordance with the standard SIS 923505.

In this test, the flooring material according to the invention had an indentation of 0.88 mm after 5 min and a recovery of 89.8% after 24 h. The corresponding values of the PVC-based flooring material were, respectively, 0.74 mm and 87.8%. Thus, the flooring material according to the invention had a slightly higher indentation value than did the PVC-based flooring material, but this was compensated for by a higher degree of recovery.

EXAMPLE 4

In this Example, one determined the residues left after combustion of the flooring material according to the invention and the PVC-based flooring material, as well as the deposition requirement created by these combustion residues. The flooring materials were burnt to ashes at 550° C.

The results of the test are indicated in the Table below.

| Flooring material | Ashes after combustion | | Deposition requirement for ashes and bound chlorine | |
|---|---|---|---|---|
| | kg/m² | % by weight of starting material | kg/m² | % by weight of starting material |
| Invention | 0.12 | 5.9 | 0.12 | 5.9 |
| PVC | 0.84 | 27.6 | 2.4 | 70 |

It is evident from this Table that the flooring material according to the invention yields less ash and thus involves much smaller deposition requirements than does the PVC-based flooring material. The much greater deposition requirement of the PVC-based flooring material is, inter alia, due to the addition of lime/dolomite to bind released chlorine.

EXAMPLE 5

This Example aims at demonstrating the content of metals, which are environmentally objectionable and originate from fillers and other additives, found in the flooring material according to the invention and the PVC-based flooring material. Thus, the contents of these metals were determined in ashes from the combustion of the flooring materials by dissolving the ashes in concentrated nitric acid. The dissolution was performed by mixing the ashes and the nitric acid in a container of Teflon®, whereupon the container was sealed and heated in a microwave oven. Samples that had not been burnt to ashes were used for determining the contents of cadmium and lead. The final determination of the metal contents was performed with the aid of Plasma emission spectrometry (ICP-AES) or Plasma mass spectrometry (ICP-MS). The metal contents determined appear from the Table below.

| | Invention g/m² | PVC g/m² | Test method |
|---|---|---|---|
| Aluminium | 0.002 | 12 | ICP-AES |
| Lead | 0.000 | 0.015 | ICP-MS |
| Cadmium | 0.0000 | 0.0001 | ICP-MS |
| Copper | 0.000 | 0.003 | ICP-AES |
| Chromium | 0.000 | 0.008 | ICP-AES |
| Zinc | 0.00 | 0.15 | ICP-AES |

It is evident from the Table that the flooring material according to the invention causes no, or but insignificant, environmental pollution owing to its metal content. It should be pointed out that the PVC-based flooring material has an adverse effect on the environment not only as a result of its metal content but also as a result of the addition of lime/dolomite to bind released chlorine.

I claim:

1. A flooring material, comprising:
   30–70 parts by weight of a copolymer of ethylene and an α-olefin having 4–10 carbon atoms,
   20–40 parts by weight of polypropylene,
   5–20 parts by weight of a crosslinked ethylene polymer,
   10–25 parts by weight of an organic filler,
   0.2–7 parts by weight of a flame retardant,
   0.1–2 parts by weight of an antistatic agent, and
   0.1–1 part by weight of a stabiliser,
   and that the material is free from inorganic fillers.

2. A flooring material as set forth in claim 1 comprising:
   40–60 parts by weight of a copolymer of ethylene and an α-olefin having 4–10 carbon atoms,
   25–30 parts by weight of polypropylene,
   5–15 parts by weight of a crosslinked ethylene polymer,
   10–20 parts by weight of an organic filler,
   0.6–4 parts by weight of a flame retardant,
   0.1–1 part by weight of an antistatic agent, and
   0.1–1 part by weight of a stabiliser.

3. The flooring material of claim 1 wherein the α-olefin employed is octene.

4. The flooring material of claim 1 wherein the crosslinked ethylene polymer is a copolymer of ethylene and an ethylenically unsaturated silane compound.

5. The flooring material of claim 4 wherein the copolymer contains 1–30% by weight of the silane compound.

6. The flooring material of claim 1 wherein the organic filler is selected from one or more of: starch cellulose and polyethylene having a melt index below 0.1 g/10 min (190° C./21.6 kg) and a phase stability in the flooring material of at least about 200° C.

7. The flooring material of claim 1 wherein the flame retardant comprises a silicone and an organic metal salt.

8. The flooring material of claim 7 wherein the organic metal salt is magnesium stearate.

9. The flooring material of claim 1 wherein the antistatic agent comprises glycerol stearate.

10. The flooring material of claim 1 wherein the stabilizer is a sterically hindered phenol.

11. The flooring material of claim 2 wherein the α-olefin employed is octene.

12. The flooring material of claim 3 wherein the crosslinked ethylene polymer is a copolymer of ethylene and an ethylenically unsaturated silane compound.

13. The flooring material of claim 5 wherein the organic filler is selected from one or more of: starch, cellulose and polyethylene having a melt index below 0.1 g/10 min (190° C./21.6 kg) and a phase stability in the flooring material of at least about 200° C.

14. The flooring material of claim 4 wherein the flame retardant comprises a silicone and an organic metal salt.

15. The flooring material of claim 6 wherein the flame retardant comprises a silicone and an organic metal salt.

16. The flooring material of claim 4 wherein the antistatic agent comprises glycerol stearate.

17. The flooring material of claim 7 wherein the antistatic agent comprises glycerol stearate.

18. The flooring material of claim 4 wherein the stabilizer is a sterically hindered phenol.

19. The flooring material of claim 7 wherein the stabilizer is sterically hindered phenol.

20. The flooring material of claim 8 wherein the stabilizer is a sterically hindered phenol.

* * * * *